United States Patent [19]
Zumbro

[11] 3,973,656
[45] Aug. 10, 1976

[54] SUSPENDED FIXTURE ASSEMBLY
[75] Inventor: David J. Zumbro, Eugene, Oreg.
[73] Assignee: Merco Products, Inc., Eugene, Oreg.
[22] Filed: Dec. 20, 1974
[21] Appl. No.: 534,670

[52] U.S. Cl. .............................. 191/12 R; 240/71; 242/107; 248/330
[51] Int. Cl.² ...................................... H02G 11/02
[58] Field of Search ..................... 191/12 R, 12.2 R; 240/71; 242/84.43, 107 R, 157 R, 158 R; 248/330

[56] References Cited
UNITED STATES PATENTS

| | | | |
|---|---|---|---|
| 1,025,026 | 4/1912 | Sprague | 248/330 X |
| 2,439,298 | 4/1948 | Horan | 242/84.43 X |
| 2,750,492 | 6/1956 | Young | 240/71 |
| 3,248,063 | 4/1966 | Sheldon et al. | 242/158 R X |

FOREIGN PATENTS OR APPLICATIONS 383,112  2/1908  France .............................. 248/330

OTHER PUBLICATIONS

*National Electrical Code* 1962, "Standard . . . For Electric Wiring . . . ", National Board of Fire Underwriters, 10–1962, pp. 78–84.

Primary Examiner—Stephen G. Kunin
Attorney, Agent, or Firm—Kolisch, Hartwell, Dickinson & Stuart

[57] ABSTRACT

A suspended electrical fixture assembly including a supporting bracket, a fixture, and a line extending from the bracket to the fixture holding the latter in a suspended state. The line is taken up on a drum powered by a motor spring in a drum assembly mounted on said bracket. A spool anchored from free rotation on the bracket has an intermediate portion of the line wrapped thereabout, with such forming a bight which is in frictional engagement with the spool.

5 Claims, 3 Drawing Figures

SUSPENDED FIXTURE ASSEMBLY

This invention relates to fixture assemblies, and more particularly to such an assembly having a suspended fixture which is adjustable to different heights.

Various types of devices have been proposed for adjustably suspending a fixture. A common fault of many is that it is difficult to adjust a fixture to a desired height with the fixture then not having a tendency to creep upwardly or downwardly from this adjusted position. Some constructions may operate properly with the fixture only partially extended from the means from which the fixture is suspended, but with a creeping tendency being noted when the fixture is fully extended. Another difficulty noted with existing constructions is that they don't stand up under hard usage, with the means providing for adjustability in the height of the fixture tending to malfunction after a short period of time. Another consideration, with electrical fixtures that draw a heavy current load, such as a heater and the like, is that it is usually inadvisable, from a safety standpoint, to rely on winding and unwinding of the conductor cord when providing for adjustability in the height of the fixture.

A general object of the invention, therefore, is to provide a suspended fixture assembly which includes a vertically adjustable fixture which is easy to operate and highly reliable.

Another object is to provide such an assembly which affords easy adjustment in the height of the fixture, with the fixture having minimal tendency to creep either upwardly or downwardly once the fixture has been placed in a given adjusted position.

Another object of the invention is to provide an improved suspended electrical fixture assembly which is particularly well suited for the suspension of an electrical heater and like devices which draw relatively heavy current loads.

These and various other objects and advantages of the invention will become more fully apparent as the following description is read in conjunction with the accompanying drawings wherein.

Figure 1:
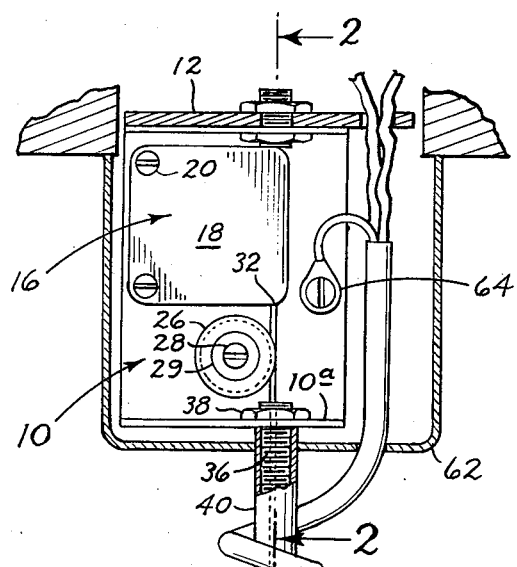
FIG. 1 illustrates a suspended electrical fixture assembly as contemplated by the invention.

The embodiment of the invention specifically described herein includes an electrical infrared heater as the fixture which is suspended in the assembly, of the type that might be used in cafeterias or other commercial establishments for the heating of trays of food. In such an installation it might be expected that the height of the fixture will be adjusted relatively frequently, to accommodate changing in the food trays being heated, to vary the heating action of the heater, to accommodate clean up, and for other reasons. In this type of installation, obviously, reliability is very important, as is the requirement that the heater will stay in a given position once it has been placed there.

Referring to the drawins, the suspended electrical heater assembly illustrated includes a supporting bracket 10 adapted to be secured to a support such as an electrical outlet box through an adapter plate partially shown at 12. An electrical fixture, in the form of an infrared heater, is partially shown at 14, such fixture being held in a suspended state below frame 10 by a construction now more fully to be described.

Mounted on bracket 10 is a spring-powered drum assembly given the general reference numeral 16. Such includes a casing 18 which is secured to bracket 10 by fasteners 20. Revolvably mounted within the casing is a drum or reel 22 partially shown in an enlarged perspective view in FIG. 3. A helical spring 24 functions as a motor spring in the assembly, such having an inner extremity suitably anchored within the assembly and an outer extremity joining with the drum.

Also mounted on bracket 10, below assembly 16, is a spool 26. The spool is secured in place against a side of the bracket by nut and bolt assembly 28 and washer 29. The nut and bolt assembly is tightened sufficiently so as to hold the spool functionally clamped against the side of the bracket. This serves to anchor the spool whereby it is prevented from rotating. The spool is disposed on the bracket with the axis of the spool horizontal.

Figure 2:
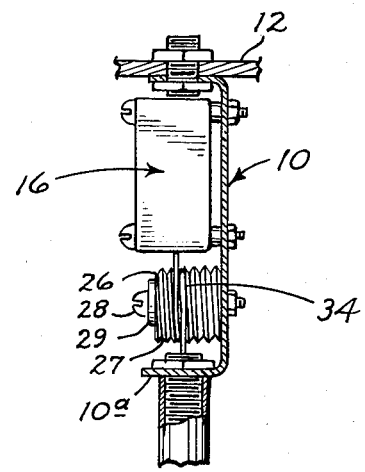
FIG. 2 is a view of upper parts of the assembly shown in FIG. 1 taken along the line 2—2 in FIG. 1.

As can be seen in FIG. 2, the spool is formed with a helical groove 27 extending about its periphery. In a preferred embodiment of the invention the spool is made of a tough plastic material, such as nylon or teflon, such materials providing a tough wear surface about the periphery of the spool.

An elongate line 30, preferably of metal, such as a wire cord, has its upper extremity secured to drum 22 of assembly 16. The drum in the assembly is biased by spring 24 to take up the line on the drum with such collecting as windings thereon.

The casing of drum assembly 16 is apertured adjacent the base thereof at 32. Line 30 extends downwardly from the drum through this aperture to an expanse of line shown at 34 which is wrapped about spool 26 in a winding or wrap which substantially encircles the spool. This wrap of line forms a bight which is in frictional engagement with the periphery of the spool. The line where such extends about the spool seats in helical groove 27 earlier described.

Secured to a flange 10a at the base of bracket 10 is an elongate, hollow, threaded shaft 36. Such shaft extends through an accommodating bore provided in flange 10a, and a nut 38 screwed onto the upper extremity of the shaft bears against the upper face of flange 10a. A spacer sleeve 40 encompasses the shaft where such protrudes below the base of flange 10a. Nut 42 screwed onto a lower extremity of the shaft bears against the bottom end of the spacer sleeve to complete the connection of the shaft with bracket 10.

Line 30 extends downwardly from spool 26 in a vertical expanse which passes downwardly though the interior of shaft 36.

Fixture 14 earlier described includes a heat bulb fitted within a shade, portions of which are shown at 44. Secured to an upper extremity of the shade is a "hicky" or bracket 46. Line 30 is secured to fixture 14 through an attachment shown at 48 with hicky 46.

Encircling the hicky is a cylindrical housing section 50 with its base resting on shade 44. Washer 52 closes off the top section 50. Suitably secured to an upper extremity of the bracket, or hicky, 46 is a hollow, threaded shaft 56. A spacer sleeve 54 bearing against the top of washer 52 surrounds the upper portion of shaft 56. A nut 58 screwed onto the upper extremity of shaft 56 holds the sleeve 54 with its base bearing against washer 52. Line 30 extends downwardly through the hollow interior of shaft 56 to the point of attachment 48 with hicky 46.

A conductor cord 60 supplies electrical current to fixture 14. Such takes the form of a coiled conductor which surrounds line 30 where such extends from the bracket 10 to the fixture 14. Immediately below bracket 10 and above housing section 50 the conductor cord extends about the spacer sleeves 40, 56 described. The spacer sleeves tend vertically to position the elongate coiled expanses of conductor cord in regions below the bracket 20 and above the fixture, and reduce chances of the cord riding against the wire line 30.

Encasing the bracket 10 drum assembly 16, and spool 26 adjacent the top of the assembly is a canopy 62. Such is secured to adapter plate 12 in a suitable manner, as by elongate screws (not shown) extending between the base of the canopy and the adapter plate.

Conductor cord 60 contains three conductors electrically insulated from each other. One of the conductors in the cord provides a ground path from the fixture which bypasses line 30 and metallic components in the drum assembly 18. Thus, it will be seen in FIG. 1 that one of the conductors of the cord within the canopy 62 extends to an electrical connection 64 with bracket 10. A similar connection of this conductor is made with metallic portions of shield 14 within housing section 50. By bypassing the wire line 30, inadvertent damage to the metallic components of drum assembly 16 is avoided.

Figure 3:
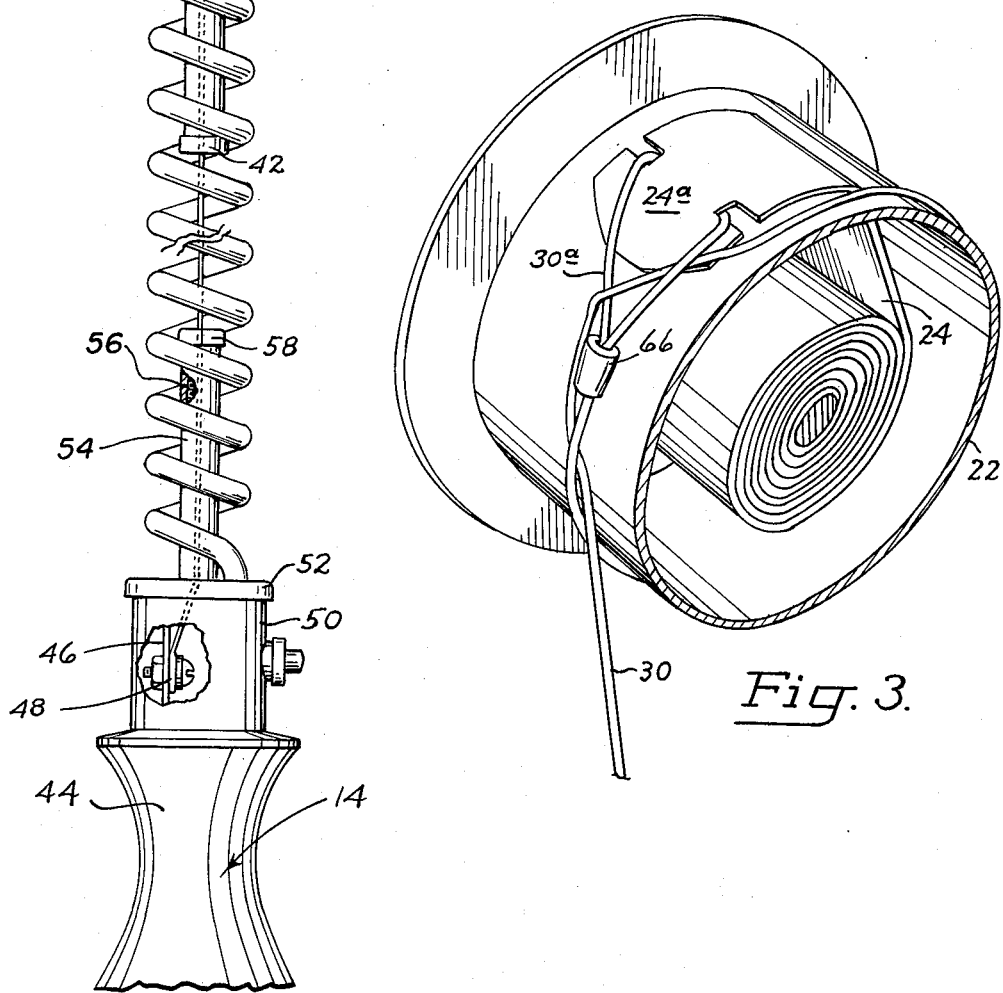
FIG. 3 is an enlarged, perspective view, of portions of a drum in a spring-powered drum assembly provided in the fixture assembly.

It will be noted, and with reference to FIG. 3, that the upper end of line 30 is secured to the drum 22 of drum assembly 16 though a loop which encircles the drum. More specifically, a ferrule 66 forms a bight portion 30a in the end of line 30, which bight portion fits about a notched tongue portion 24a of spring 24 which extends outside the drum 22. From bight portion 30a the line 30, progressing toward the opposite end of the line, extends about the drum, through the interior of the bight portion, and thence under part of the line which encircles the drum. With the type of connection described, and when the line is pulled downwardly in FIG. 3 to pull all windings off the drum, any resulting shock produced is absorbed by the entire drum and its mounting within casing 18, instead of by any localized point of connection on the drum where localized high stress could result.

Describing the operation of the device, if it is desired to raise the fixture, the fixture is lifted manually. This relieves gravitational pull on line 30 and causes a relaxation in the frictional grab of the line where such extends about the spool. This enables the spring in assembly 16 to take up line. With the fixture at the desired elevation, and with lifting effort no longer applied to the fixture, the weight of the fixture is effective to exert a downward pull on the bottom extremity of line 30, with tightening of the line where such extends about the spool. With the wrap of line again frictionally engaging the spool, a stable condition is reached, with the line prevented from moving in either direction relative to the spool which it encircles. Downward adjustment of the fixture is accomplished by pulling downwardly on the fixture. At this time the line is caused frictionally to slide about the spool, but the frictional resistance offered by the spool is not so great as to require undue effort in pulling downwardly on the fixture.

With the construction described, it has been found that once the fixture has been placed at the desired height there is little, if any, tendency for the fixture to creep away from the adjusted position, and this is true whether the fixture is fully extended or only slightly extended from support 10 which mounts the drum assembly. A relatively light spring may be employed in the drum assembly since it is not the drum which supports the entire weight of the fixture. The construction is highly reliable and easy to maintain.

It is claimed and desired to secure by Letters Patent:

1. A suspended electrical fixture assembly comprising, a bracket adapted for mounting on a fixed support,
 a spring-powered drum assembly mounted on said support including a drum and a motor spring urging rotation of the drum,
 a spool and means mounting the spool on said bracket adjacent said drum assembly with the spool's position relative to the drum assembly being fixed and with the spool anchored from free rotation relative to the bracket,
 an elongate line secured to said drum and taken up thereon with rotation of the drum by the motor spring,
 a fixture adapted to be suspended below said bracket,
 said line extending downwardly from said drum to an expanse which is wrapped in at least one wrap about the spool which wrap through encircling the spool forms a bight in frictional engagement with the spool, and the line thence extending downwardly from said spool to a point of attachment with said fixture, and
 a coiled conductor cord surround said line extending from adjacent the bracket to said fixture for supplying current to the fixture,
 said line with the fixture suspended serving to support a major portion of the weight of the fixture, part of which is transmitted to said bracket through said spool and part of which is transmitted to said bracket through said drum assembly, said line with the fixture suspended, and where it forms said bight, frictionally engaging said spool by reason of said spring powered drum assembly tending to take up the line against the force of gravity produced by the weight of the fixture which pulls down on the line where such extends downwardly from the fixture causing the bight to tighten on said spool, such frictional engagement with the spool being released with manual lifting of the fixture which has the effect of tending to remove the weight of the spool as a factor producing such tightening.

2. The assembly of claim 1 wherein the line is secured to said drum through a closed loop which includes a noose portion that encircles the drum, said loop being held from relative rotational movement about the drum.

3. The assembly of claim 1, wherein said anchored spool, with said bracket in operative position on a support, is disposed with the axis thereof extending horizontally.

4. The assembly of claim 3, wherein aid spool has a helical groove in the periphery thereof, and said wrap of said line seats within said helical groove.

5. A suspended electrical fixture assembly comprising, a bracket adapted for mounting on a fixed support,
 a spool mounted on said bracket with the spool's position fixed and with the spool anchored from free rotation on the bracket and with the axis of the spool assuming a horizontal position, with the bracket in operative position on a support, an elongate line with an intermediate portion thereof extending in a wrap around said anchored spool with such portion forming a bight in frictional engagement with the spool, said line extending in a vertical expanse downwardly from said spool, a fixture secured to the base of said vertical expanse of line, a spring-powered drum assembly mounted on said bracket above said spool including a drum and a motor spring urging rotation of the drum, said line extending in another expanse upwardly from said spool to a point of attachment with said drum with said drum operating to take up line with rotation of the drum under the urging of the motor spring, and a canopy encasing said bracket, spool, and drum assembly, said line with the fixture suspended and where it forms said bight frictionally engaging said spool by reason of said spring-powered drum assembly tending to take up the line against the force of gravity acting upon the weight of the fixture which pulls downwardly on the line where such extends downwardly from the spool causing the bight to tighten on said spool, said frictional engagement with the spool being released with manual lifting of the fixture which has the effect of tending to remove the weight of the fixture as a factor producing such tightening.

* * * * *